United States Patent
Tran et al.

(10) Patent No.: US 6,796,884 B1
(45) Date of Patent: Sep. 28, 2004

(54) ABRASIVITY CONTROL OF MAGNETIC MEDIA USING BURNISHING TECHNIQUES

(75) Inventors: Nang T. Tran, Lake Elmo, MN (US); William R. Qualls, River Falls, WI (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/444,880

(22) Filed: May 23, 2003

Related U.S. Application Data

(63) Continuation of application No. 10/072,124, filed on Feb. 8, 2002, now abandoned.

(51) Int. Cl.[7] .................................................. B24B 1/00
(52) U.S. Cl. .............................. 451/54; 451/58; 451/59; 451/300
(58) Field of Search ............................ 451/5, 8, 10, 11, 451/21, 54, 57, 58, 59, 41, 167, 168, 184, 300, 303

(56) References Cited

U.S. PATENT DOCUMENTS

| | | |
|---|---|---|
| 4,298,631 A | 11/1981 | Mikura et al. |
| 4,858,265 A | 8/1989 | Suzuki et al. |
| 4,888,212 A | 12/1989 | Iida et al. |
| 5,000,983 A | 3/1991 | Iida et al. |
| 5,009,929 A | 4/1991 | Iida et al. |
| 5,015,430 A | 5/1991 | Suzuki et al. |
| 5,036,629 A | 8/1991 | Ishikuro et al. |
| 5,876,270 A | 3/1999 | Honma et al. |
| 5,885,143 A | 3/1999 | Ichikawa et al. |
| 6,013,220 A | 1/2000 | Iwasaki |
| 6,129,612 A | 10/2000 | Reynen et al. |

FOREIGN PATENT DOCUMENTS

| | | |
|---|---|---|
| EP | 0 709 832 A1 | 5/1996 |
| JP | 63-98832 | 4/1988 |
| JP | 63-181120 | 7/1988 |
| JP | 1-258224 | 10/1989 |
| JP | 3-53035 | 3/1991 |
| JP | 3-212820 | 9/1991 |
| JP | 4-121818 | 4/1992 |
| JP | 6-150306 | 5/1994 |
| JP | 07-21557 | 1/1995 |
| JP | 10-233018 | 9/1998 |
| JP | 2000090433 | 3/2000 |
| JP | 2001006167 | 1/2001 |

*Primary Examiner*—Eileen P. Morgan
(74) *Attorney, Agent, or Firm*—Eric D. Levinson

(57) ABSTRACT

In one embodiment, the invention is directed to techniques for controlling the abrasivity of magnetic tape without modifying the coating formulas used to create the magnetic tape. For example, the invention may involve controlling or adjusting the abrasivity of magnetic tape using one or more burnishing techniques such as lapping, vaming or scraping. In this manner, the abrasivity of magnetic tape can be controlled or adjusted to ensure that the tape meets the necessary tape specifications without modifying the coating formulas applied during the coating process.

19 Claims, 9 Drawing Sheets

ABRASIVITY CONTROL OF MAGNETIC MEDIA USING BURNISHING TECHNIQUES

This application is a continuation of U.S. application Ser. No. 10/072,124, filed Feb. 8, 2002, now abandoned. The entire content of U.S. application Ser. No. 10/072,124 is incorporated herein by reference.

TECHNICAL FIELD

The invention relates to magnetic recording media and, in particular, control of surface characteristics of magnetic tape.

BACKGROUND

Magnetic tape is often used for storage and retrieval of data, and comes in many widths, lengths and formats. Magnetic tape remains an economical medium for storing large amounts of data. For example, magnetic tape cartridges or spools of magnetic tape are often used to back up large amounts of data for computing centers and the like. Magnetic tape cartridges also find application in the backup of data stored on smaller computers such as workstations, desktop computers and laptop computers.

The creation of magnetic tape typically involves a number of different processing steps. For example, a wide polymeric film typically undergoes a coating process in which one side of the polymeric film is coated with a nonmagnetic underlayer followed by one or more magnetic layers. The opposite side of the polymeric film is typically coated with a non-magnetic backing layer. One or more of the layers coated on the film may include head cleaning agents (HCA) to increase the abrasivity of the tape, thus allowing the tape to remove debris from the read/write head of a tape drive during use. After coating, a calendaring process typically compresses and smoothes the coated materials on the tape. The tape is then typically cut in a slitting process to realize a number of narrow magnetically coated tape strands cut to the desired width. In this disclosure, a "tape pancake" refers to a spool of magnetic tape that has been cut to a desired width.

Each individual tape pancake can be burnished, for example, by scraping, vaming, lapping, or a combination of different burnishing techniques. Burnishing further smoothes the tape surface and has been shown to significantly improve performance of magnetic tape by reducing the number of reading and recording errors. Scraping techniques typically involve feeding the tape past a scraping mechanism (scraper) to smooth or alter the surface of the tape. Vaming techniques utilize a rotating cylinder that rotates in a direction opposite the direction of incoming tape. The rotating cylinder, for example, is typically coated with industrial grade diamonds or another abrasive material to smooth or alter the surface of the tape as it passes by and contacts the rotating cylinder. Lapping techniques utilize a lapping film that is fed in a direction opposite the direction of incoming tape. For example, the lapping film may pass in one direction over a supporting structure referred to as a lapping shoe. The tape is passed over the lapping shoe in the opposite direction. The lapping shoe forces the lapping film into contact with the surface of the tape as the tape and lapping film feed past one another in opposite directions. In this manner, the lapping film can be used to effectively burnish the surface of the tape.

After burnishing the tape is typically wiped clean and then degaussed in a degaussing process. If desired, servo patterns can be magnetically written on the tape, and the tape may be spooled into a cartridge, which can then be sold as a magnetic tape cartridge. Alternatively, the burnished tape pancake may be sold with or without servo patterns written on the tape.

Abrasivity is a measure of the abrasive characteristics of magnetic tape, and is an important quality required to meet magnetic tape specifications associated with a given recording system. If abrasivity is too low, the magnetic tape may not adequately remove dust and debris from a read/write head, which can cause clogging in the read/write head during use. However, if abrasivity is too high, the tape may actually harm the read/write head during use, for example, by changing the shape of the head.

Abrasivity of magnetic tape is typically quantified by the amount of wear that the tape causes on an object formed from a specified material. For example, tape can be fed over the object at a particular speed and tension, for a defined amount of time. The amount of wear on the object as a result of contact with the tape can be used to quantify the abrasivity of the tape. The amount of wear is typically specified to ensure that the tape will function properly in a given system.

Abrasivity of magnetic tape is a complex characteristic which depends on tape particles and binder formation, tape surface, tape tension and tape speed during the coating process, head materials, humidity and temperature. The amount of head cleaning agent (HCA) in the coating formula is conventionally the main factor used to control abrasivity of magnetic tape. For example, if abrasivity of the magnetic tape is not within specification, the formula for one or more of the coatings can be modified by increasing or decreasing the amount of HCA. Adjusting the amount of HCA, however, may also affect other properties of the magnetic tape. In particular, since the thickness of magnetic layers on the tape are thin, being in the neighborhood of 10 microinches, HCA with an average sizes of about 12 microinches may stick out even after calendaring, which may affect properties of the tape such as roughness, friction, or other properties of the magnetic tape.

SUMMARY

In general, the invention is directed to techniques for controlling the abrasivity of magnetic tape without modifying the coating formulas used to create the magnetic tape. For example, the invention may involve controlling or adjusting the abrasivity of magnetic tape using one or more burnishing techniques such as lapping, vaming or scraping. In this manner, the abrasivity of magnetic tape can be controlled or adjusted to ensure that the tape meets the necessary tape specifications without modifying the coating formulas applied during the coating process. Coating is a relatively complicated process where all the coating parameters are interrelated. However, tapes coated to exhibit many optimal features often have abrasivity higher than desired values. The invention provides a simple and effective way to improve tape abrasivity without degrading other tape qualities.

Abrasivity refers to a measure of the abrasive characteristics of magnetic tape and is typically quantified by tape manufactures or makers of magnetic recording systems to ensure that the magnetic tape has acceptable abrasive characteristics. An acceptable level of abrasivity can improve the performance of a magnetic tape system by enabling the magnetic tape to remove dust or debris from the magnetic head as the magnetic head reads or writes onto the magnetic tape. Acceptable levels of abrasivity, however, are limited. If abrasivity is too high, then the magnetic tape can wear down the magnetic head, and in some cases actually change the shape of the head, which is undesirable.

In one embodiment, a method includes selecting a burnishing variable according to an acceptable level of abrasivity for magnetic media. For example, selecting the burnishing variable may comprise selecting a lapping film to be used for lapping of the magnetic media, selecting a material for a rotating cylinder to be used in vaming of the magnetic media, or selecting a scraper to be used in scraping the magnetic media. The method may also include burnishing the magnetic media according to the selection. For example, upon selecting an acceptable lapping film, burnishing the magnetic media comprises lapping the magnetic media using the selected lapping film.

A number of different burnishing variables can be selected, including any variable that affects the level of burnishing. For example, in the case where burnishing is performed using lapping techniques, additional burnishing variables that can be selected may include one or more additional lapping films, a configuration for a lapping shoe, a level of tension for the magnetic tape as it passes over the lapping shoe, a speed for the lapping film, a speed for the magnetic tape, and a level of engagement for the lapping shoe. Sizes, shapes of the grits and the type of lapping films can also affect abrasivity of the tape. In some cases, the invention may involve selecting a number of these variables and then burnishing the magnetic media according to the selections. Similar variables can also be selected if other burnishing techniques, such as vaming or scraping are used. Favorable burnishing variables can be determined experimentally to ensure that the magnetic tape meets specification.

The method may also include coating a formula which includes head cleaning agents, such as alumina ($Al_2O_3$), on a polymeric film to create the magnetic media.

The invention can provide a number of advantages. For example, the invention can provide a simple and cost effective way to adjust and control abrasivity in magnetic tape after the optimized coating conditions for the tapes have been obtained. Rather than create different coating formulas to achieve different abrasivities, the invention can use the same formula and adjust the abrasivity of the tape using burnishing techniques. In this manner, the tape manufacturing process can be simplified.

In addition, the invention can be used to more easily create magnetic tape having acceptable abrasivity, while at the same time meeting other tape specifications. As mentioned, conventional techniques control and adjust abrasivity by modifying the coating formulas. For example, abrasivity is conventionally increased by adding more head cleaning agents (HCA) to a coating formula used to coat a magnetic layer on the tape.

The additional HCA, however, often affects other magnetic tape properties because additional HCA changes the number of magnetic particles in the formula per unit volume. Since the invention does not require modification of the formula to adjust abrasivity, the other magnetic tape properties may remain unaffected. Thus, if a particular magnetic tape meets most tape specifications, but has an abrasivity that is too high, the invention provides a simple solution. In that case, the tape could simply be burnished by an amount sufficient to reduce the abrasivity accordingly, leaving other tape properties intact. Choice of the burnishing variables, however, may need balance both desired abrasivity and error reduction (or dropout, which is the conventional reason for burnishing). In other words, too much burnishing may reduce abrasivity significantly at the expense of the reduction of errors.

Additionally, the invention can use the same coating formula in creating magnetic tapes having different abrasivities. Thus, tapes for two different magnetic recording systems can be created to have different levels of abrasivity using the same coating formula. In this manner, the creation of a number of different coating formulas can be avoided. Moreover, changes in abrasivity can be accomplished on a post-coating basis as needed. Another advantage of the invention is that it can smooth and clean the surface of the tape, and at the same time, achieve desired levels of abrasivity.

Additional details of various embodiments are set forth in the accompanying drawings and the description below. Other features, objects, and advantages of the invention will be apparent from the description and drawings, and from the claims.

DETAILED DESCRIPTION

Figure 1:
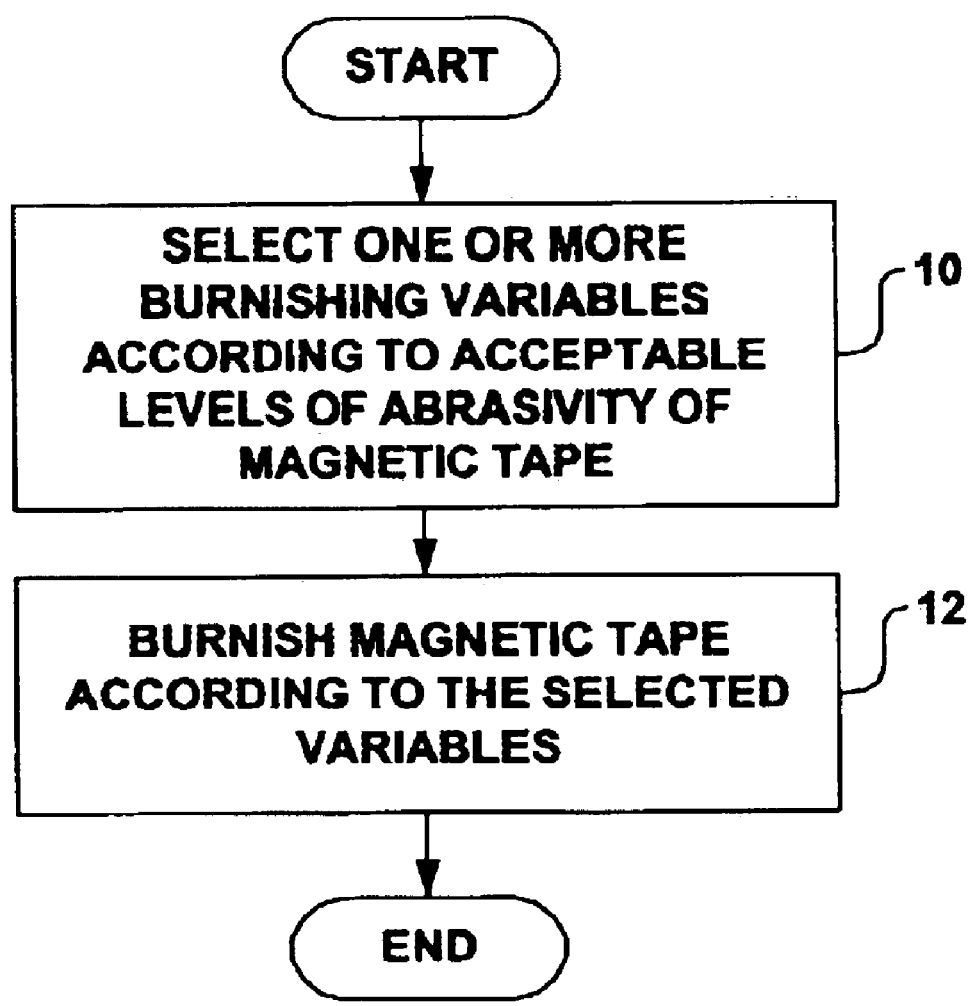
FIG. 1 is a flow diagram illustrating a method for controlling abrasivity of magnetic tape according to the invention.

FIG. 1 is a flow diagram illustrating a method for controlling abrasivity of magnetic tape according to the invention. As shown, one or more burnishing variables are selected according to acceptable levels of abrasivity for the magnetic tape (10). Magnetic tape is then burnished according to the selected variables (12). In this manner, the acceptable levels of abrasivity can be achieved on the magnetic tape. The burnishing variables can be experimentally tested to determine the relationship between the burnishing variables and abrasivity. In this manner, experimental testing of burnishing variables can be used to promote favorable selections of the burnishing variables.

Burnishing refers to a process of abrading the surface of magnetic tape. Burnishing is conventionally performed for the purpose of reducing the error rate of magnetic tape by removing error causing peaks in the coatings on the tape. Burnishing can be accomplished in a number of different ways, including scraping, vaming and lapping. To burnish magnetic tape by scraping, the magnetic tape is fed past a scraper to abrade and smooth the surface of the tape. To burnish magnetic tape by vaming, the tape is fed past a rotating cylinder coated with an abrasive material. The cylinder rotates in a direction opposite the direction of incoming tape to abrade and smooth the surface of the tape. To burnish magnetic tape by lapping, the tape is fed over a lapping shoe, with a lapping film passing over the lapping shoe in the opposite direction. The lapping shoe forces the lapping film into contact with the surface of the tape as the tape and lapping film are fed past one another in opposite directions to effectively abrade and smooth the surface of the tape. Additional details of these different burnishing techniques are discussed below.

The invention recognizes that burnishing can be used to control or adjust the abrasivity of magnetic tape in addition to reducing the error rates. Conventionally, abrasivity of magnetic tape is controlled and adjusted by controlling the amount of head cleaning agent (HCA) in the formulas coated on the tape. Adjusting the amount of HCA, however, may also affect other properties of the magnetic tape. The invention provides a simple and effective way to control or adjust the abrasivity of magnetic tape without modifying the formulas coated on the tape.

The invention accomplishes an acceptable level of abrasivity in magnetic tape by selecting one or more burnishing variables based on the acceptable level of abrasivity (10). In some cases, a number of different burnishing variables are selected. Once selected, the variables can be used in the burnishing process to ensure that the magnetic tape has acceptable levels of abrasivity (12).

A wide variety of burnishing variables can be selected. Indeed, the particular variables that are selected typically depend on the particular burnishing process that is used. For example, if lapping techniques are used to burnish the tape, the burnishing variables that can be selected according to acceptable levels of abrasivity may include: types of lapping films and materials, configurations and shapes for lapping shoes, levels of tension for the magnetic tape, speeds for the lapping film and the magnetic tape, and levels of engagement for the lapping shoe, i.e., the position of the lapping shoe relative to the magnetic tape. If scraping techniques are used to burnish the tape, the burnishing variables that can be selected according to acceptable levels of abrasivity may include: the scraper, the shape and composition of the scraper, the location of the scraper, the level of tension for the magnetic tape, the speed for the magnetic tape, and the level of engagement for the scraper. If vaming techniques are used to burnish the tape, the burnishing variables that can be selected according to acceptable levels of abrasivity may include: the abrasive material on the rotating cylinder, the level of tension for magnetic tape, the size of the rotating cylinder, the speed for the rotating cylinder, the speed for the magnetic tape, and a level of engagement for the rotating cylinder. These and other variables can be selected to ensure that burnishing results in the magnetic tape having acceptable levels of abrasivity.

Favorable burnishing variables can be experimentally determined by testing a number of burnishing variables. In particular, the burnishing variables can be experimentally tested to determine the effect that particular variables have on the abrasivity of magnetic tape. For example, a given type of magnetic tape can be lapped using different lapping films or different combinations of lapping films. All of the other burnishing variables can be fixed during the experimental testing of different lapping films. The abrasivity of the lapped magnetic tape can then be tested to determine the effect that different lapping films or different combinations of lapping films have on abrasivity of the magnetic tape. In this manner, a relationship between lapping films and the abrasivity of the lapped magnetic tape can be established for a given type of magnetic tape. Lapping films or combinations of lapping films can then be selected so as to ensure that magnetic tape will have acceptable levels of abrasivity after being lapped. In this manner, favorable burnishing variables can be experimentally determined and then selected for use in the burnishing process. Other burnishing variables can be experimentally tested in a similar manner to further improve the selection process.

Figure 2A:
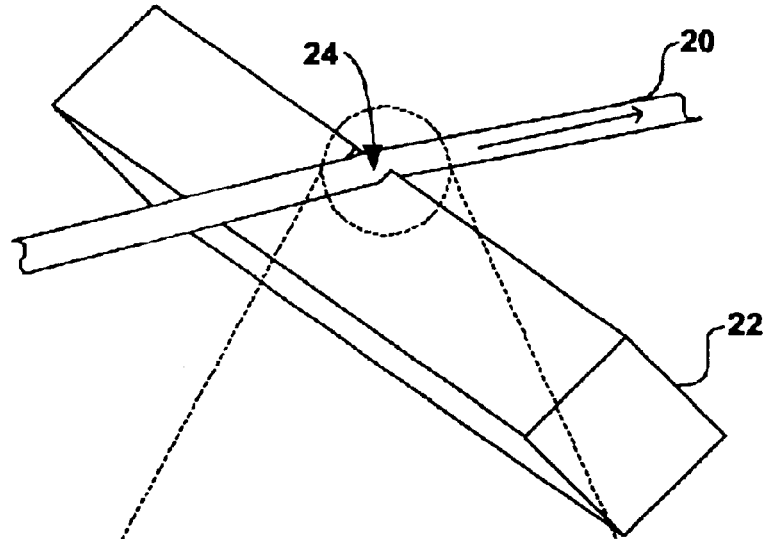
FIG. 2A is a perspective view of a magnetic tape passing over an object for the purpose of measuring abrasivity.
Figure 2B:
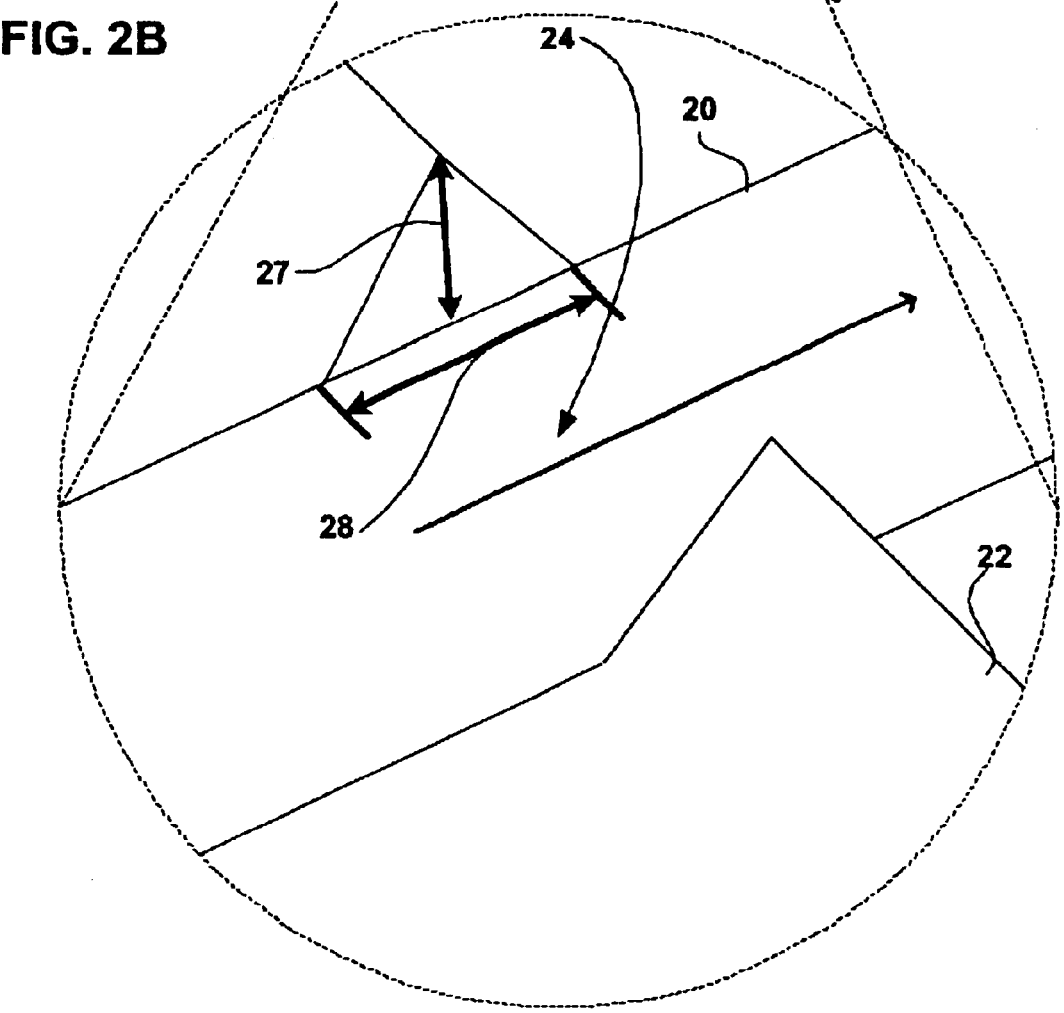
FIG. 2B is a close-up perspective view of a portion of FIG. 2A.

FIGS. 2A and 2B are perspective views of magnetic tape passing over an object for the purpose of measuring abrasivity. Abrasivity refers to a measure of the abrasive characteristics of magnetic tape and is typically quantified by tape manufacturers or makers of magnetic recording systems to ensure that the magnetic tape has acceptable abrasive characteristics. In other words, abrasivity measures the tendency of magnetic tape to wear magnetic heads during use. An acceptable level of abrasivity can improve the performance of a magnetic tape system by enabling the magnetic tape to remove dust or debris from the magnetic head as the magnetic head reads or writes on the magnetic tape. However, too much abrasivity can result in the tape reshaping the magnetic head during use.

To measure and quantify abrasivity of magnetic tape 20, it is passed over object 22 at a defined speed and tension for a defined amount of time. Magnetic tape 20 wears a groove 24 into object 22. Object 22 is typically defined in terms of its shape and composition. Magnetic tape manufacturers or magnetic tape system manufactures typically define the composition and shape of object 22. For example, object 22 may have a defined composition of ferrite, alphasil (approximately 5% silicone, 5% aluminum and 90% ferrite), or some other defined material such as sapphire. Object 22 is typically defined to have a square-shaped cross-sectional profile, although any shape could be used as long as the shape was adequately defined.

Having defined the shape and composition of object 22 as well as the speed, tension, and amount of time that tape 20 passes over object 22, the apparatus illustrated in FIGS. 2A and 2B can be used to measure abrasivity of magnetic tape 20. In particular, the width 28 of groove 24 can provide a quantification of the abrasivity of magnetic tape 20. Alternatively, the height 27 of groove 24 or both the height 27 and the width 28 could be used to provide quantification of the abrasivity. Typically, a number of similar magnetic tapes 20 are tested for abrasivity and the results are averaged to obtain a more precise statistical estimate of the actual abrasivity associated with tape 20.

In one specific example, tape 20 has a length of approximately 1,700 feet. Tape 20 can pass over object 22 at a speed of 39.4 inches per second with approximately 5 ounces of tension. Object 22 can be comprised of four edged bar of aphasil or sapphire. Values of abrasivity can be determined by the removal of material along width 28 of groove 24. The measurement can be repeated three times and then averaged. Width 28 of groove 24 can be measured under a microscope and photographs can be taken. In that case, the units of abrasivity can be expressed in microinches of the average of width 28. Other methods for quantifying abrasivity of magnetic tape could also be used.

Figure 3:
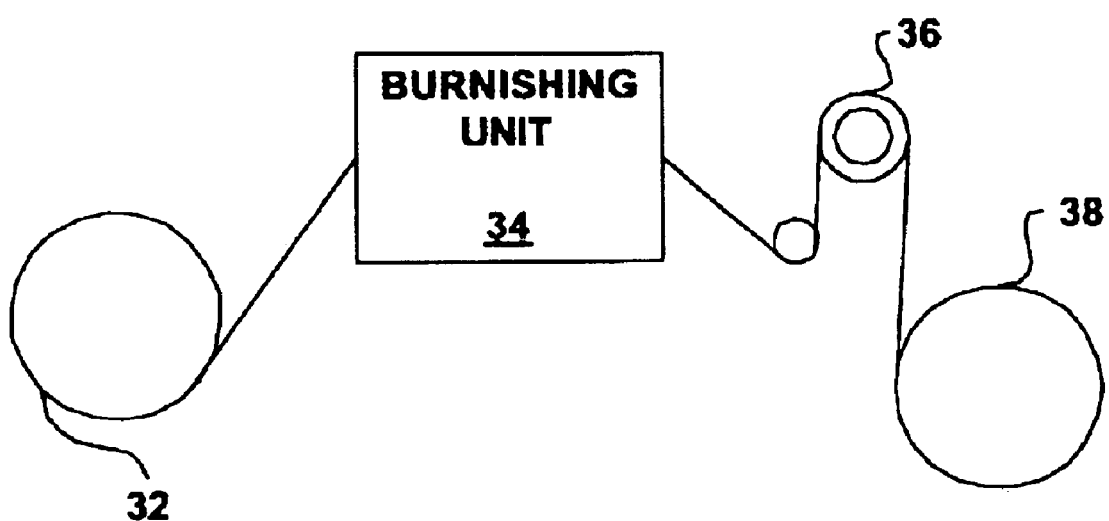
FIG. 3 is a block diagram of a burnishing system that can be used to control abrasivity of magnetic tape in accordance with the invention.

FIG. 3 is a block diagram of a burnishing system 30 that can be used to control abrasivity of magnetic tape in accordance with the invention. Magnetic tape is unspooled from magnetic tape pancake 32 and burnished by burnishing unit 34. Burnishing unit 34 may include one or more burnishing stations and possibly one or more wiping stations. For example, each burnishing station may perform a lapping, vaming or scraping technique on the magnetic tape. Also, both the front and back sides of the tape can be burnished in the burnishing unit. For example, burnishing the back layer of the magnetic tape can reduce height of the peaks that can otherwise emboss on the magnetic layer when the tape is wound into a tape pancake. Additional details of suitable lapping, vaming or scraping techniques are provided below.

Magnetic clutch mechanism 36 can be used to provide tension control of the magnetic tape. After being burnished by an amount sufficient to achieve acceptable abrasivity on the magnetic tape, the tape is re-spooled as magnetic tape pancake 38.

Burnishing system 30 defines a number of different burnishing variables that are selected according to acceptable levels of abrasivity for the magnetic tape. For example, the speed at which the magnetic tape feeds through the system and the tension of the magnetic tape controlled by magnetic clutch mechanism 36 define exemplary variables that can be selected in a manner that results in acceptable levels of burnishing of the magnetic tape. In addition burnishing unit 34 can define a number of burnishing variables that can be selected accordingly. As described in greater detail below, burnishing unit 34 can perform the burnishing by lapping, scraping, vaming, or any combination of these different burnishing techniques. In each case, burnishing variables can be selected according to whatever burnishing technique is used to ensure that the magnetic tape has acceptable levels of abrasivity. Experimental testing of the various burnishing variables can be used to determine the effect of each variable on abrasivity on the magnetic tape. The selection process can then be used to promote acceptable levels of abrasivity on the magnetic tape.

Figure 4:
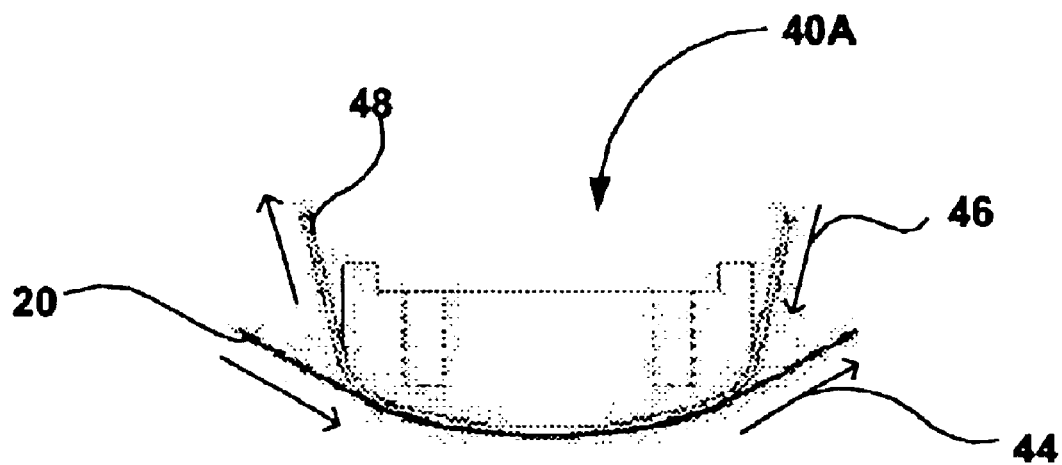
FIG. 4 is a cross-sectional side view illustrating a lapping technique that can be used to burnish tape for the purpose of controlling abrasivity.

FIG. 4 is a cross-sectional side view illustrating a lapping technique that can be used to burnish tape for the purpose of controlling abrasivity. In that case, lapping shoe 40A can form part of burnishing unit 34 as illustrated in FIG. 3. In FIG. 4, lapping shoe 40A has a horseshoe-like configuration. Magnetic tape 20 passes by lapping shoe 40A in a first direction 44. Lapping film 48 passes over lapping shoe 40A in a second direction 46, which is opposite the first direction 44. In this manner, lapping film 48 can effectively burnish the surface of magnetic tape 20.

Figure 5:
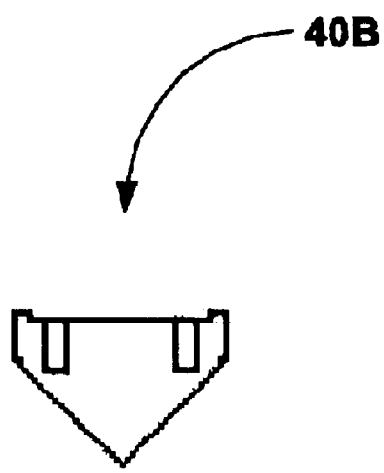
FIGS. 5, 6 and 7 are cross-sectional side views of alternative configurations for a lapping shoe.
Figure 6:
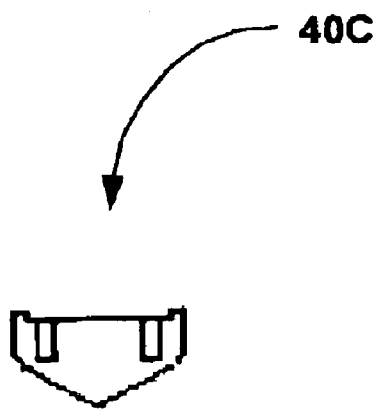
Figure 7:
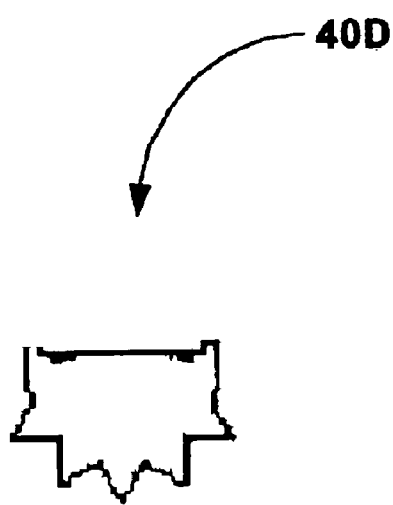

FIGS. 5–7 are cross-sectional side views of alternative configurations for a lapping shoe 40. In particular, FIGS. 5 and 6 illustrate exemplary embodiments of lapping shoes 40B and 40C respectfully, having triangular configurations. FIG. 7 illustrates yet another embodiment of lapping shoe 40D, having a star-like configuration that creates several points of discrete contact where the lapping film is forced against the magnetic tape. As can be appreciated by FIGS. 4–7, the shape of the lapping shoe can be selected as one of the burnishing variables. In some embodiments, each lapping shoe can be experimentally tested. In that case, the most favorable lapping shoe for causing a desired abrasively reduction, as determined by the experimental testing, can be selected accordingly. In some embodiments, lapping shoes can be formed with additional features to improve other qualities of the magnetic tapes. Also, air or an inert gas may be applied over the lapping shoe to help maintain intimate contact between the lapping film and the tape.

Lapping films or sets of lapping films represent other burnishing variables that can be selected according to the acceptable level of abrasivity on the magnetic tape. Lapping films such as silicon carbide films having grit sizes of 0.5 microns, 1.0 microns, and 3.0 microns are commercially available from 3M Abrasive Systems Division of Minnesota Mining and Manufacturing Co. of Saint Paul, Minn., or USF Surface Preparation of Maple Grove, Minn. Aluminum Oxide lapping films and diamond lapping films having various grit sizes are also commercially available from 3M Abrasive Systems Division of Minnesota Mining and Manufacturing Co. of Saint Paul, Minn. The films could also be purchased from other sources. Moreover, lapping films of other girt sizes or other compositions could also be used, depending on the specifications of the magnetic tape.

Experiments have shown that lapping generally reduces the abrasivity of magnetic tape without significantly changing other characteristics of the magnetic tape. Moreover, it has been found that lapping films of smaller grits sizes generally give a smaller reduction in abrasivity on magnetic tape. For this reason, lapping films can be selected in a manner that promotes acceptable levels of abrasivity in magnetic tape. If after coating, the tape requires a large reduction in abrasivity, lapping films having larger grit sizes can be selected. Alternatively, if a smaller reduction in abrasivity is required, lapping films having smaller grit sizes can be selected. In this manner, abrasivity of magnetic tape can be controlled via burnishing. Advantageously, a modification of the coating formula is not required.

Additional burnishing variables can also be selected such as: the level of engagement of lapping shoe 40 with magnetic tape 20, i.e., the position of lapping shoe 40 relative to magnetic tape 20, the speed at which magnetic tape 20 is fed through the system, the speed at which lapping film 48 passes over lapping shoe 40, the number of lapping shoes and lapping films used, the grit sizes or grit compositions in the lapping film or films, the tension in the tape, and the like. The speed of the magnetic tape is generally significantly larger than the speed of the lapping film. In particular, to achieve acceptable levels of abrasivity, the ratio of the speed of the magnetic tape to the speed of the lapping film can be chosen to be approximately between 1000 to 1 and 50,000 to 1. Other burnishing variables which affect the abrasivity of magnetic tape may also exist.

In some cases, lapping techniques can provide advantages over scraping or vaming techniques. In particular, lapping can burnish the surface of the magnetic tape more effectively than scraping or vaming. Lapping films are renewable in the sense that the surface area of the lapping film is typically used only once to burnish the tape surface. New lapping films can be loaded into the burnishing unit as needed. The renewable aspect of lapping films makes lapping a much cleaner process than vaming or scraping. In contrast vaming and scraping techniques reuse the same rotating cylinder (in the case of vaming) or the same scraping mechanism (in the case of scraping). Consequently, scraping and vaming techniques typically result in a larger amount of debris build-up in the system. This debris can reduce the effectiveness of burnishing and typically requires the burnishing unit to be periodically cleaned. In contrast, lapping is a much cleaner process, which improves the quality and consistency of the burnishing.

Scraping techniques, however, offer different advantages in accordance with the invention. In particular, experiments have shown that scraping techniques can result in a smaller reduction of abrasivity than lapping techniques. In some cases, scraping resulted in no reduction of abrasivity of magnetic tape. Thus, if little or no reduction of abrasivity is required for a particular tape, a scraping mechanism can be selected as a burnishing variable. In this manner, selection of the burnishing variable can ensure that the magnetic tape will have acceptable levels of abrasivity after being burnished.

Figure 8:
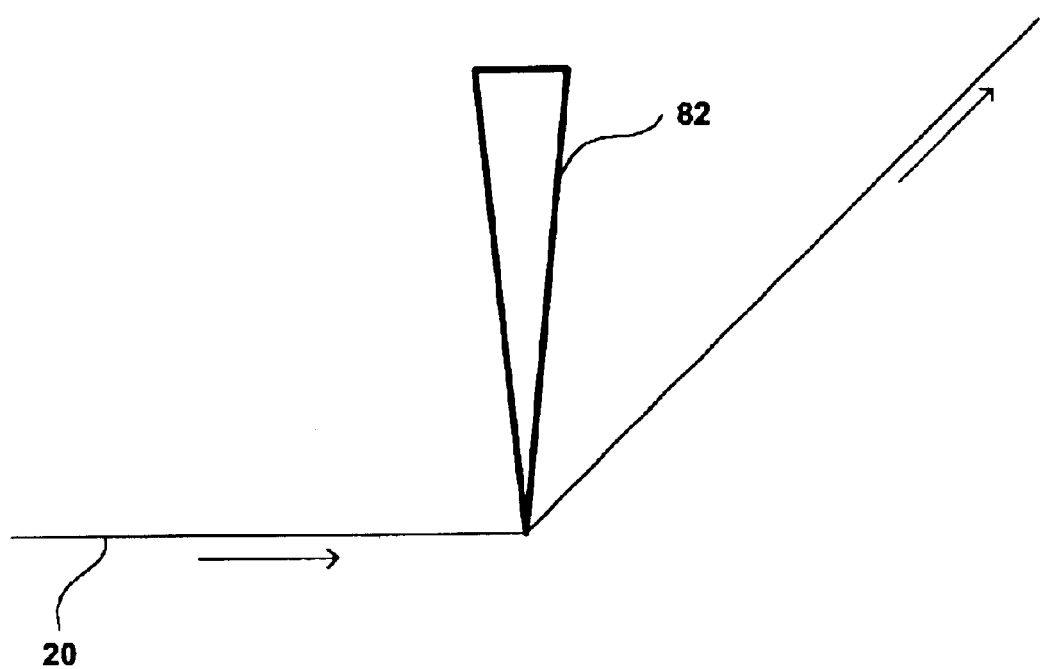
FIG. 8 is a cross-sectional side view illustrating a scraping technique that can be used to burnish tape for the purpose of controlling abrasivity.

FIG. 8 is a cross-sectional side view illustrating a scraping technique that can be used to burnish tape for the purpose of controlling abrasivity. In that case, scraper 82 can form part of burnishing unit 34 as illustrated in FIG. 3. For example, as mentioned above selecting scraper 82 can, in some cases, result in little or no reduction of abrasivity of magnetic tape 10 during the burnishing process. Additional burnishing variables that can also be selected include: the composition and shape of scraper 82, the level of engagement of scraper 82 with magnetic tape 20, i.e., the position of scraper relative to tape 20, the speed at which magnetic tape 20 is fed through the system, the number of scrapers used, the tension in the tape, and the like. Multi-blade scrapers could also be used to improve abrasivity in the tape.

Figure 9:
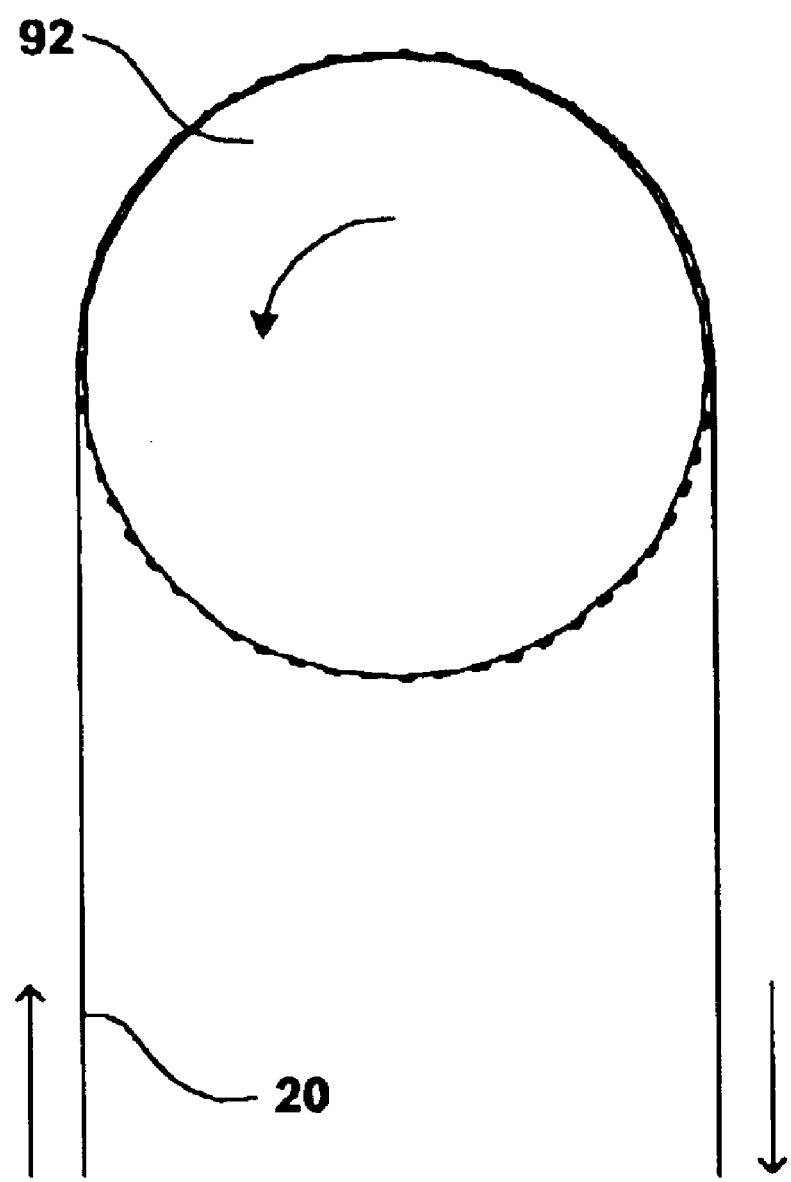
FIG. 9 is a cross-sectional side view illustrating a vaming technique that can be used to burnish tape for the purpose of controlling abrasivity.

FIG. 9 is a cross-sectional side view illustrating a vaming technique that can be used to burnish tape for the purpose of controlling abrasivity. In that case, rotating cylinder 92 can form part of burnishing unit 34 as illustrated in FIG. 3. If a vaming technique is used to burnish the tape for the purpose of controlling abrasivity, burnishing variables that may be selected include: a material for a rotating cylinder, a level of tension for magnetic tape, a speed for the rotating cylinder, a speed for the magnetic tape, a level of engagement for the rotating cylinder, an angle of wrap, and the like.

In some embodiments, lapping techniques, scraping techniques and/or vaming techniques can all be selectively used in combination to control or adjust the abrasivity of magnetic tape. For example, lapping techniques may be used to reduce the abrasivity of magnetic tape by a large amount and then additional techniques, such as scraping, may be used to reduce the abrasivity of the magnetic tape by a little bit more. In this manner, abrasivity of the magnetic tape can be adjusted to acceptable levels without modifying the coating formulas.

Figure 10:
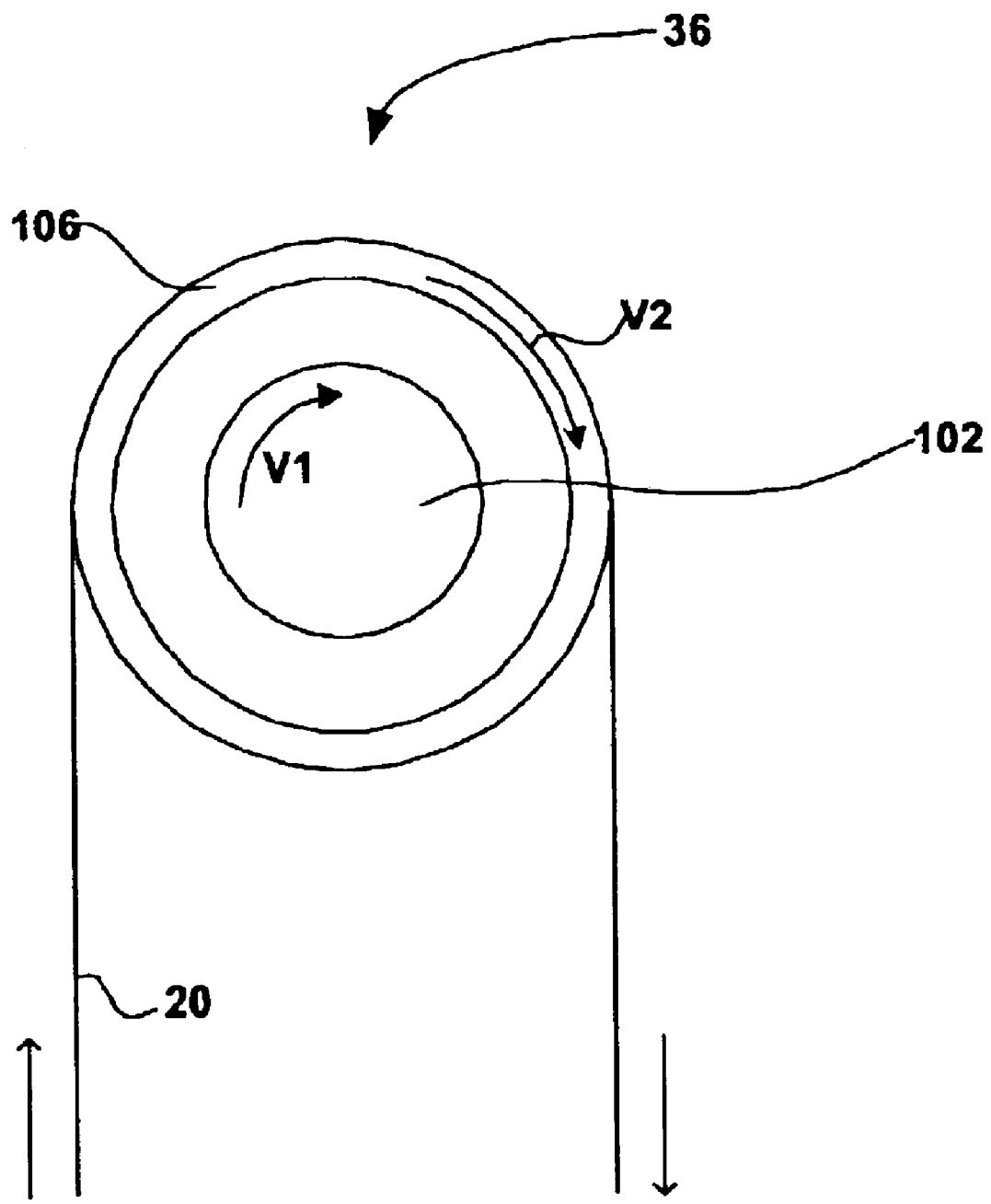
FIG. 10 is a cross-sectional side view illustrating a magnetic clutch mechanism that can be used to control tension in magnetic tape during a burnishing process.

FIG. 10 is a cross-sectional side view illustrating a magnetic clutch mechanism that can be used to control tension in magnetic tape during a burnishing process. As mentioned, a level of tension is one of the variables that can be selected to control or adjust the level of abrasivity in magnetic tape. In that case, upon selecting the appropriate level of tension, magnetic clutch mechanism can be used to ensure that the tension remains at the selected level during the burnishing process.

For example, as illustrated in FIG. 10, magnetic clutch mechanism 36 has an inner cylinder 102 that includes magnetic material. The inner cylinder 102 may rotate at a constant first angular velocity (V1). Magnetic clutch mechanism 36 also includes an outer cylinder 106, for example, comprised of steel laminated with copper on the inner cylindrical surface of the outer cylinder 106. The outer surface of outer cylinder 106 may be covered with a rubber material, or the like, to improve friction between magnetic tape 20 and outer cylinder 106. Outer cylinder 106 magnetically engages inner cylinder 102 causing it to rotate at a second angular velocity (V2).

Suitable magnetic clutch mechanisms are commercially available from a variety of vendors. For example, suitable clutch mechanisms may be purchased from Magnetic Technologies LTD of Oxford, Mass., U.S.A. The magnetic clutch mechanism 36 can be used to control the tension in magnetic tape 20 as it is burnished. Importantly, the level of tension may be related to the level of burnishing, and thus the level of abrasivity on the magnetic tape after burnishing. For this reason, a level of tension can be selected to ensure that the magnetic tape has acceptable levels of abrasivity. In some cases, tension can be experientially tested to determine the relationship between tension and abrasivity of magnetic tape. In that case, a favorable level of tension can be determined and then selected for a given burnishing process.

Figure 11:
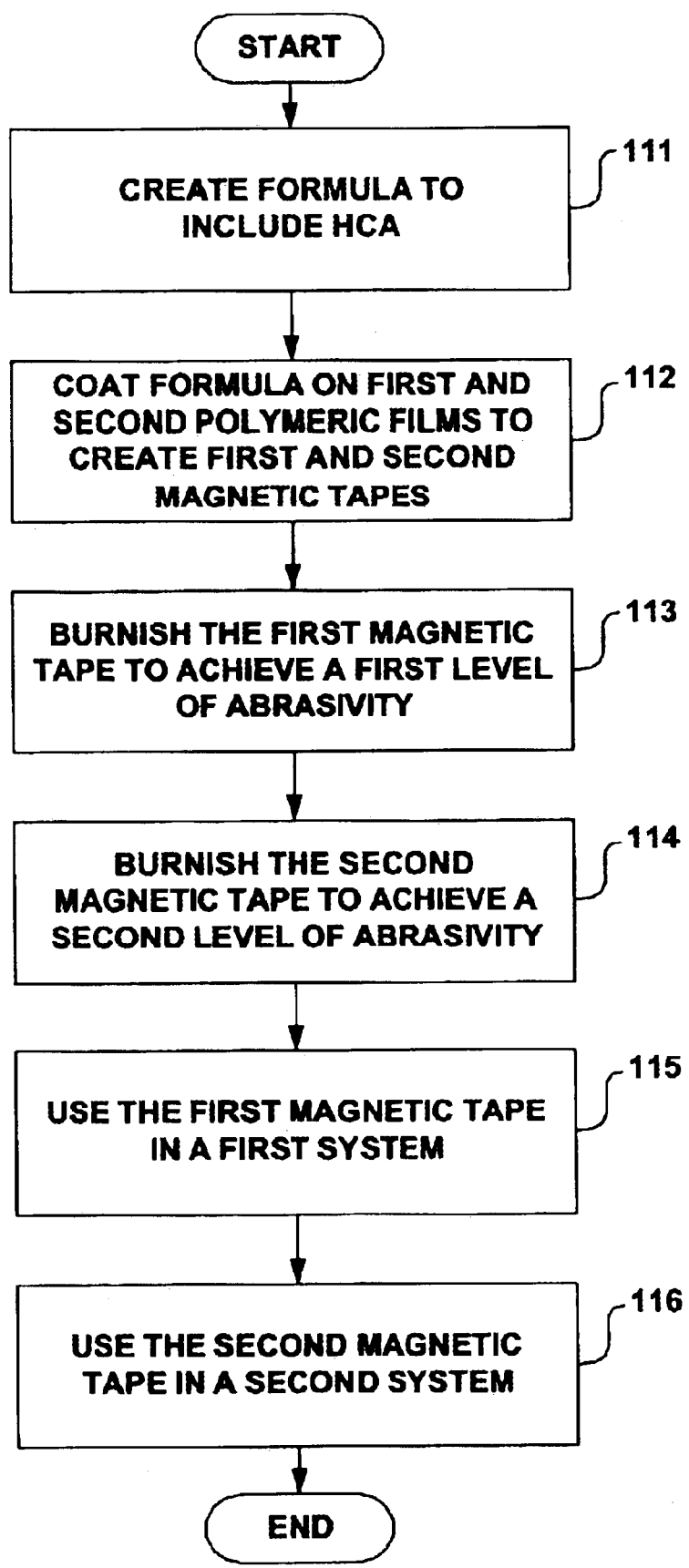
FIG. 11 is flow diagram illustrating a method according to the invention.

FIG. 11 is a flow diagram illustrating a method according to the invention. As shown, a formula is created to include head cleaning agents (HCA) (111). For example, Alumina ($Al_2O_3$) is a typical head cleaning agent that can be added to the formula. The formula including the head cleaning agent is then coated on first and second polymeric films to create first and second magnetic tapes (112). A number of different processing steps can then be performed on the first and second magnetic tapes, as desired, including calendaring and slitting processes. Eventually, the first magnetic tape is burnished to achieve a first level of abrasivity (113) and the second magnetic tape is burnished to achieved a second level of abrasivity (114). The first level of abrasivity may be an abrasivity within the specification of a first magnetic recording system, while the second level of abrasivity may be an abrasivity within the specification of a second magnetic recording system. Thus, the first magnetic tape can be used in the first magnetic recording system (115) and the second magnetic tape can be used in the second magnetic recording system (116). In this manner the invention can be used to realize magnetic tape meeting abrasivity specifications for different systems using magnetic tape coated with the same formula.

The magnetic tape coated with a particular formula can be used to experimentally test the burnishing variables. In particular, one or more burnishing variables can be tested specifically with tape coated with a particular formula. In this manner, a more precise correlation between the burnishing variables and abrasivity of tape coated with the particular formula can be determined. One or more burnishing variables can then be selected in a manner that promotes acceptable levels of abrasivity on the magnetic tape. Moreover, if tape coated with the same formula is to be used in two or more different systems, the selection can be catered for each system, to promote acceptable levels of abrasivity for the tape to be used in the first system and different acceptable levels of abrasivity for the tape to be used in the second system.

EXAMPLE 1

A number of different burnishing techniques were applied to magnetic tape coated with the same formula. In particular, a coating formula having Alumina ($Al_2O_3$) as a head cleaning agent was used. The head cleaning agent comprised approximately 8 to 20 percent by weight of the total metal particles in the coating formula The abrasivity of the magnetic tape was measured before and after the burnishing. For various magnetic tapes, different combinations of lapping films were used to burnish the tape. A number of similar samples were tested and the results were averaged. The speed of the magnetic tapes and lapping films, tension, and other burnishing variables were held constant for the experiment. For other magnetic tape, a sapphire blade was used as a scraper to burnish the tape. In that case, the speed, tension and other scraping variables were substantially the same as the speed and tension used in the lapping process. The results are summarized in TABLE 1.

TABLE 1

| Burnishing Technique | Material | Abrasively before burnishing | Abrasively after burnishing | % reduction in tape abrasivity |
|---|---|---|---|---|
| Lapping 1 | 0.5 micro inch silicone carbide lapping film | 245 micro inches | 180 micro inches | 26.5% |
| Lapping 2 | 3 micro inch silicone carbide lapping film | | | |
| Lapping 1 | 0.5 micro inch silicone carbide lapping film | 315 micro inches | 255 micro inches | 19% |
| Lapping 2 | 0.5 micro inch silicone carbide lapping film | | | |
| Lapping 1 | 0.5 micro inch aluminum oxide lapping film | 320 micro inches | 245 micro inches | 23.4% |
| Lapping 2 | 0.5 micro inch aluminum oxide lapping film | | | |
| Scraping | sapphire blade | 270 micro inches | 285 micro inches | No change |
| Scraping | sapphire blade | 240 micro inches | 260 micro inches | No change |

From the experiment it was discovered that lapping films of smaller grit sizes produced a smaller reduction in abrasivity than lapping films of larger grit sizes. In addition, silicon carbide lapping films tended to reduce abrasivity of the magnetic tape by a smaller amount than aluminum oxide lapping films. The magnetic tapes scraped with the sapphire blade had little or no reduction in abrasivity before and after the scraping. From these results, it was determined that burnishing variables can be selected to provide control and adjustment of abrasivity of magnetic tape.

A number of embodiments of the invention have been described. For example, inventive techniques for adjusting or controlling the abrasivity of magnetic tape have been described. Nevertheless, various modifications may be made without departing from the scope of the invention. For example, the invention may use any burnishing techniques to control media abrasivity, including burnishing techniques other than lapping, scraping and vaming. In addition, the invention may be used to control abrasivity of other magnetic media such as magnetic disks and the like. Moreover, additional burnishing variables may affect abrasivity, and in that case, additional variables can be selected according to an acceptable level of abrasivity. Accordingly, other embodiments are within the scope of the following claims.

What is claimed is:

1. A method to achieve an acceptable level of abrasivity in a magnetic medium, wherein abrasivity refers to a measure of abrasive characteristics of the magnetic medium determined by an amount of wear that the magnetic medium causes to a specified object what the medium is passed over the object at a specified speed and tension for a specified amount of time, the method comprising:
    identifying a quantified level of abrasivity for the magnetic medium that meets a specification for the magnetic medium, wherein the quantified level of abrasivity defines the amount of wear to the specified object for the magnetic medium to meet the specification; and
    burnishing the magnetic medium to an extent sufficient to achieve the level of abrasivity in the magnetic medium that meets the specification.

2. The method of claim 1, further comprising selecting a lapping film based on the identified level of abrasivity, wherein burnishing the magnetic medium includes lapping the magnetic medium using the selected lapping film.

3. The method of claim 2, wherein selecting the lapping film includes selecting a grit size for the lapping him based on the identified level of abrasivity.

4. The method of claim 1, further comprising selecting a lapping shoe based on the identified level of abrasivity, wherein burnishing the magnetic medium includes lapping the magnetic medium using the selected lapping shoe, wherein a lapping film is passed over the selected lapping shoe to lap the magnetic medium.

5. The method of claim 4, wherein selecting the lapping shoe includes selecting a lapping shoe that has several points of discrete contact where the lapping film is forced against the magnetic medium as the lapping film passes over the lapping shoe with several points of discrete contact.

6. The method of claim 1, further comprising selecting a number of lapping films based on the identified level of abrasivity, wherein burnishing the magnetic medium includes lapping the magnetic medium using the selected lapping films, wherein each of the number of lapping films passes over respective lapping shoes to lap the magnetic medium.

7. The method of claim 6, wherein selecting the number of lapping films includes selecting a lapping film to lap a front side of the magnetic medium and selecting a different lapping film to tap aback side of the magnetic medium.

8. The method of claim 1, wherein the magnetic medium comprises magnetic tape, further comprising selecting a lapping film and a ratio of a tape speed relative to a speed of the lapping film based on the identified level of abrasivity, wherein burnishing the magnetic medium includes lapping the magnetic medium using the selected lapping him at the selected ratio of tape speed relative tote speed of the lapping film.

9. The method of claim 8, further comprising selecting the ratio to be approximately between the ranges of 1000 to 1 and 50,000 to 1 in order to cause the magnetic medium to meet the specification.

10. The method of claim 1, wherein the magnetic medium comprises magnetic tape, further comprising selecting a lapping film, a configuration for a lapping shoe, a level of tension for the magnetic tape, a speed forte lapping film, a speed for the magnetic tape, and a level of engagement for the lapping shoe based on the identified level of abrasivity, wherein burnishing the magnetic medium comprises lapping the magnetic tape using the selected lapping film, the selected configuration for the lapping shoe, the selected level of tension for the magnetic tape, the selected speed for the lapping film, the selected speed for the magnetic tape, and the selected level of engagement for the lapping shoe, wherein the selected lapping film is passed over the selected lapping shoe to lap the magnetic medium.

11. The method of claim 1, further comprising:
    experimentally determining a relationship between burnishing and levels of abrasivity for the magnetic medium; and
    identifying a level of burnishing that will cause the magnetic medium to meet the specification based on the experimentally determined relationship.

12. The method of claim 1, further comprising selecting a material for a rotating cylinder based on the identified level of abrasivity, wherein burnishing the magnetic medium comprises vaming the magnetic medium using the rotating cylinder.

13. The method of claim 1, wherein the magnetic medium comprises magnetic tape, the method further comprising selecting a material for a rotating cylinder, a level of tension for the magnetic tape, a speed for the rotating cylinder, a speed for the magnetic tape, and a level of engagement for the rotating cylinder based on the identified level of abrasivity, wherein burnishing magnetic medium comprises venting the magnetic tape using the selected material for the rotating cylinder, the selected level of tension for the magnetic tape using the selected speed for the rotating cylinder, the selected speed for the magnetic tape, and the selected level of engagement for the rotating cylinder.

14. The method of claim 1, wherein the magnetic medium comprises magnetic tape, further comprising selecting a scraper based on the identified level of abrasivity, wherein burnishing the magnetic medium comprises scraping the magnetic tape using the selected scraper.

15. The method of claim 14, wherein selecting the scraper includes selecting a multi-blade scraper.

16. The method of claim 1, wherein the magnetic medium comprises magnetic tape, further comprising selecting a scraper, a level of tension for the magnetic tape, a speed for the magnetic tape, and a level of engagement for the scraper based on the identified level of abrasivity, wherein burnishing the magnetic medium comprises scraping the magnetic tape using the selected scraper, the selected level of tension for the magnetic tape, the selected speed for the magnetic tape, and the selected level of engagement for the scraper.

17. The method of claim 1, wherein the magnetic medium comprises a first magnetic medium, the method further comprising:

identifying another level of abrasivity for a second magnetic medium that meets a second specification for the second magnetic medium, wherein the second specification is different from the that specification; and burnishing the second magnetic medium to an extent sufficient to achieve the another level of abrasivity in the second magnetic medium that meets the second specification.

18. The method of claim 17, further comprising prior to burnishing the first and second magnetic media, coating a same coating formula on the first and second media.

19. A method for achieving an acceptable level of abrasivity in a magnetic tape, wherein abrasivity refers to a measure of abrasive characteristics of the magnetic tape determined by an amount of wear that the magnetic tape causes to a specified object when the tape is passed over the object at a specified speed and tension for a specified amount of time, the method comprising:

experimentally determining a relationship between burnishing and levels of abrasivity for the magnetic tape by determining different amounts of wear that one or more experimental magnetic tapes cause at different levels of abrasivity of the experimental magnetic tapes;

identifying a quantified level of burnishing that will cause the magnetic tape to meet a specification for the magnetic tape based on the experimentally determined relationship, wherein the quantified level of abrasivity defines the amount of wear to the specified object for the magnetic tape to meet the specification; and burnishing the magnetic tap to an extent determined by the relationship sufficient to achieve the abrasivity in the magnetic tape that meets the specification.

\* \* \* \* \*

UNITED STATES PATENT AND TRADEMARK OFFICE
CERTIFICATE OF CORRECTION

PATENT NO. : 6,796,884 B1
DATED : September 28, 2004
INVENTOR(S) : Nang T. Tran and William R. Qualls It is certified that error appears in the above-identified patent and that said Letters Patent is hereby corrected as shown below:

Column 11,
Line 55, "what" should read -- when --.

Column 12,
Lines 4 and 33, "him" should read -- film --.
Line 27, "tap aback" should read -- lap a back --.
Line 34, "tote" should read -- to the --.
Line 43, "forte" should read -- for the --.

Column 13,
Line 6, "venting" should read -- vaming --.
Line 8, "tape using the" should read -- tape, the --.

Column 14,
Line 29, "tap" should read -- tape --.

Signed and Sealed this

Thirtieth Day of August, 2005

JON W. DUDAS
*Director of the United States Patent and Trademark Office*